Nov. 21, 1967  H. CAGIN  3,354,259

ELECTRIC OUTLET BOX

Filed March 11, 1966

INVENTOR
*HARRY CAGIN*

BY *Jay M. Cantor*

ATTORNEY

3,354,259
ELECTRIC OUTLET BOX
Harry Cagin, Bedford Heights, Ohio, assignor to Halex Die Casting Company, Bedford Heights, Ohio, a corporation of Ohio
Filed Mar. 11, 1966, Ser. No. 533,665
7 Claims. (Cl. 174—53)

This invention relates to electric outlet boxes and more particularly to electric outlet boxes for outdoor use.

Weatherproof outlet boxes have found great use in the electrical industry and many such devices are known to the prior art. Outlet boxes of the prior art have required many parts and several operational steps, thereby being relatively expensive to manufacture.

One prior art electrical outlet box has been formed from a cast body having based side and end walls and a plurality of ribs on the internal walls for supporting a mounting plate, the mounting plate being secured to the box by staking a portion of the box inwardly over the mounting plate and staking a portion of the mounting plate outwardly into a recess in the box inner surface to prevent movement of the mounting plate in the box. Devices of this type are relatively expensive to produce due to the requirement that two staking operations be provided, one for securing the mounting plate against movement out of the box and a second for preventing movement of the mounting plate laterally along the length of the box. Furthermore, the staking operation whereby a portion of the mounting plate is staked into the recess in the box requires extreme precision and thereby further increases the cost of manufacture.

In accordance with the present invention, the problems inherent in the prior art are overcome and a relatively inexpensive electric outlet box is provided. Briefly, a box is provided having bottom side and end walls with ridges provided in the interior of the walls for supporting a mounting plate. The walls also include recesses at the far ends thereof for receiving a flange portion forming a part of a T-shaped mounting plate so that the mounting plate can rest within the recesses and on the ridges and be positioned slightly below the top surface of the box. The use of the flange and the recess eliminates the necessity for use of a jig to perform later operations in the manufacture of the electric outlet box. The side walls of the box also may include a raised excess portion of metal which is then peened over the mounting plate. The peening operation prevents the mounting plate from movement out of the box, whereas, the flange prevents movement of the mounting plate along the length of the box. It can be seen that the peening operation requires no precision and merely requires that at least a portion of the mounting plate be below the peened portion on each side of the box. Accordingly, an outlet box in accordance with the present invention requires merely one peening operation and eliminates the requirement for precision or the requirement for the use of a jig during manufacture.

It is an object of this invention to provide a weatherproof electric outlet box for electric wiring devices comprising a generally hollow rectangular casting having one open side and having plates which are slightly below the surface of the open side and positioned at the opposite ends thereof, the plates being separately manufactured, as by stamping, the plates being secured to the casting by means of a flange in the plate, a recess in the casting for receiving the flange and a single peening operation.

It is a further object of the invention to provide an electric outlet box in which mounting plates are installed in a casting without the use of a jig and by a simple single peening operation.

It is yet a further object of this invention to provide an electric outlet box having a raised metallic portion at predetermined positions for peening over a mounting plate positioned therein.

It is a still further object of this invention to provide an electric outlet box having a flange mounting plate secured within recesses in a hollow rectangular casting against lateral movement and secured by a peening operation against vertical movement.

Other objects and features of the invention will become apparent to those skilled in the art from the following description of a preferred embodiment of the invention which is provided by way of example and not by way of limitation together with the annexed drawings, in which.

Figure 1:
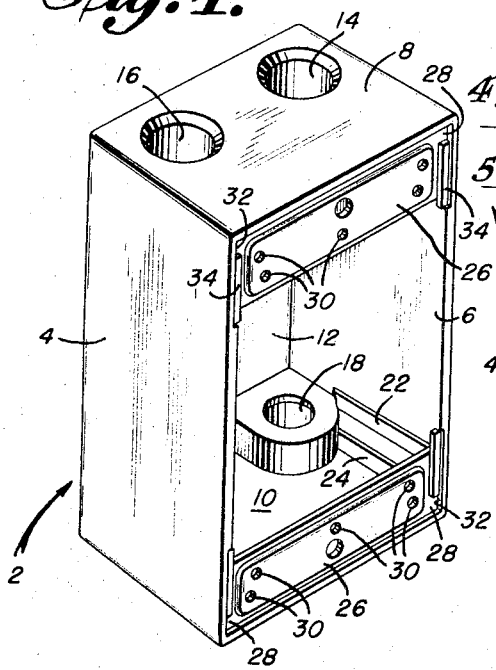
FIGURE 1 is a perspective view of an outlet box in accordance with the present invention.

Refering now to the drawings and particularly to FIGURE 1 thereof, the outlet box in accordance with the invention includes a casting 2 having side walls 4 and 6, end walls 8 and 10 and a base portion 12. The casting includes a number of inwardly extending bosses 14, 16, 18 and 20 (not shown). These bosses may be threaded, if desired, for receiving mating elements. The base 12 of the casting also includes a boss (not shown) for receiving a conduit or the like. This boss may also be threaded. Also cast integrally with the side walls 4 and 6 are eight rib members 22 and 24, four at either end of the casting, two in each corner portion thereof.

The ribs 24 are provided in each of the corners formed by the end and side walls of the casting 2 and extend upwardly to within a short distance of the upper edges of the end and side walls, this distance being slightly greater than the width of the mounting plate 26 (FIGURE 3) to be mounted thereon as explained hereinbelow. In a similar manner, the four ribs 22 are provided on the side walls and spaced from the end walls a distance substantially equal to or slightly less than the height of the mounting plates 26. The ribs 22 also extend upwardly to within a short distance of the upper edges of the side walls, this distance being slightly greater than the width of one of the mounting plates 26 as explained hereinabove.

The ribs 22 and 24 are provided during the formation of the hollow casting 2 along with recesses 32 formed therein which will be explained hereinbelow.

A mounting plate 26 is positioned at each end of the box 2, these mounting plates (FIGURE 3) being substantially rectangular and include a pair of keys or flange portions 28 at two corners thereof to provide a T-shape. The mounting plates 26 are formed by stamping or the like and are provided with a plurality of apertures 30 for positioning electrical apparatus such as wiring devices, switches, outlets and the like thereon. The apertures 30 may be threaded, if desired, to receive mating members.

The mounting plate 26 is secured against lengthwise movement by the flange members 28 thereof which is seated in apertures 32 in the side walls 4 and 6 of the box 2. The mounting plates 26 are secured against movement out of the box by the peened metallic portions 34 which overlie the mounting plates 26. The combination of the flange members 28 within the recesses 32 and the peened portions 34 over the edges of the mounting plates 26 completely secures the mounting plate in the box 2 against any lateral or outward motion.

Figure 2:
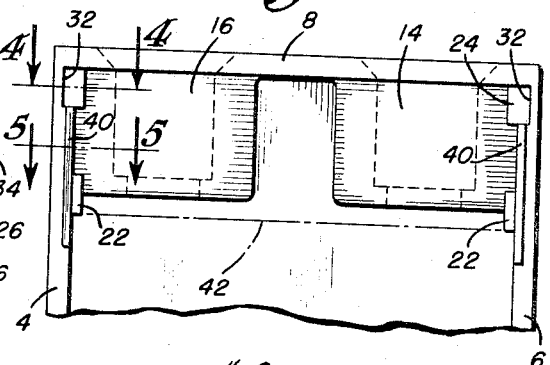
FIGURE 2 is a fragmentary cross section of the outlet box prior to placement of the mounting plate therein.
Figure 4:
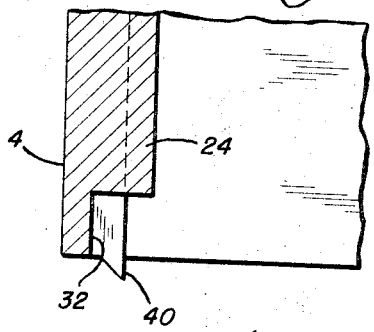
FIGURE 4 is a cross sectional view taken along the line 4—4 of FIGURE 2 illustrating particularly the excess metallic portion on the side wall and the recess for receiving the mounting plate flange.
Figure 5:
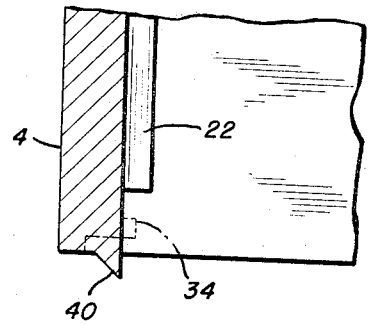
FIGURE 5 is a fragmentary cross sectional view taken along the line 5—5 of FIGURE 2.
Figure 6:
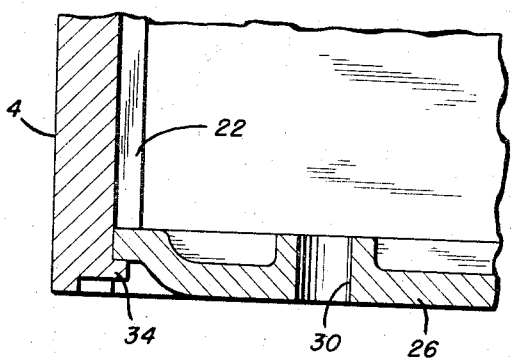
FIGURE 6 is a fragmentary cross sectional view of the electrical outlet box after the mounting plate has been peened and positioned therein.

Referring now to FIGURES 2, 4 and 5, there is shown a portion of the cast box 2 including the side walls 4 and 6 and the end wall 8. Also shown are the bosses 14 and 16 which extend through the end wall 8. The side wall includes a raised excess metal portion or lip 40, better shown in FIGURES 4 and 5. The portion 40 provides extra metal for peening and can be dispensed with. Also shown are the ribs 22 integral with the side walls 4 and 6 as well as the recesses 32 which are formed in the side walls 4 and 6 and extend downwardly a distance slightly greater than the width of one of the mounting plates 26 to one of the ribs 24.

Figure 3:
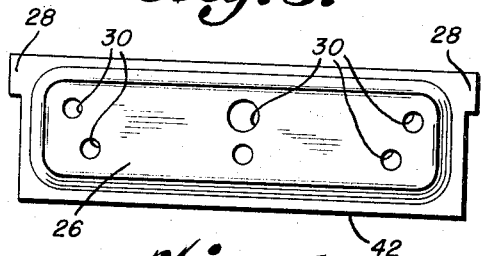
FIGURE 3 is a front view of the mounting plate utilized in accordance with the present invention.

The outlet box as set forth in FIGURE 1 is formed by placing the mounting plate 26 of FIGURE 3 on the box portion 2 as set forth in FIGURE 2 with the flange members 28 of the mounting plate positioned in the recesses 32 and resting upon the ribs 24. The forward edge of the mounting plates 26 represented as 42 in FIGURE 3 and/or the forward portions of the side edges thereof rest on the ribs 22. The positioning of the flanges 28 in the recesses 32 prevents movement of the mounting plates 26 along the length of the box 2. Therefore, so long as the box is positioned with its open end facing upward, the mounting plate will be properly positioned without the requirement for an external jig or the like. The excess metal portion 40 which is positioned along a portion of the side walls 4 and 6 is then peened over the mounting plates 26 to secure same against vertical motion out of the box. It will be seen that the peening of the excess metal 40 (sometimes along with some of the metal from the side walls) requires no precision and merely requires that at least a portion of the mounting plates 26 have peened metal thereover. Of course, if the excess metal 40 is not present, the peened metal is composed entirely of metal from the side walls of the box 2.

The electrical outlet box as provided hereinabove is formed with merely a single peening operation requiring relatively little precision and eliminating the costly step of handling and placement in a jig for operation.

As an alternative embodiment, rather than peening a portion of the excess metal 40 and/or the side walls 4 and 6 over the mounting plates 26, the portions of the side walls 4 and 6 standing above the mounting plate can be forced inwardly over the mounting plate. This is provided by applying a force to the side walls normal to the side walls at points thereon above the level of the mounting plates 26. The result is substantially the same as in the above described embodiments.

Although the invention has been described with respect to a specific preferred embodiment thereof, many variations and modifications thereof will immediately become apparent to those skilled in the art. It is therefore the intention that the appended claims be interpreted as broadly as possible in view of the prior art to include all such variations and modifications.

What is claimed is:

1. A weatherproof electrical outlet box comprising, in combination, a cast metallic box including base, side and end walls defining a cavity for receipt of an electrical wiring device, recesses in said box side walls, a plurality of integral ribs extending upwardly from the base along the side walls adjacent the ends of the box, at least one wiring device mounting plate resting with one surface upon corresponding ribs and having key means extending from opposite edges slidably mounted in at least one pair of recesses, and means retaining the key means in the recesses.

2. A box as defined in claim 1 wherein the retaining means comprises material of the side walls peened over the opposite surface.

3. A box as defined in claim 1 wherein the retaining means comprises a lip integral with a free edge of opposed side walls and at least a portion of each lip peened over the opposite surface.

4. An outlet box comprising a casting having a base, side walls, and end walls, recesses in the side walls adjacent the ends thereof contiguous to the end walls, a plurality of integral ribs extending upwardly from the base along the side walls adjacent the ends of the box and a lip integral with each of the edges of the side walls extending from the edges and being thinner than the side walls.

5. A box as defined in claim 4 wherein the lip has a surface coplanar with the inside of the side wall.

6. A method for making an outlet box having a mounting plate secured to an open end of the box comprising the steps of casting the box with recesses in opposed walls, forming a mounting plate having flanges on opposite edges thereof, inserting the mounting plate in the box with the flanges in the recesses, and peening wall sections of the box over the plate.

7. A method as defined in claim 6 wherein the wall sections are formed with a lip on each of a pair of opposed sections and the lip portions are peened over the plate.

References Cited

UNITED STATES PATENTS 2,500,897  3/1950  Friedman.
3,215,769  11/1965  Slater _____ 174—53

LARAMIE E. ASKIN, *Primary Examiner.*